(12) United States Patent
Cusack et al.

(10) Patent No.: US 8,066,295 B1
(45) Date of Patent: Nov. 29, 2011

(54) COMPOSITE BICYCLE FRAME WITH IMPROVED STRUCTURE, GEOMETRY, SEAT ATTACHMENT AND FORK

(75) Inventors: Douglas A. Cusack, Cottage Grove, WI (US); James E. Colegrove, Lake Mills, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 685 days.

(21) Appl. No.: 11/874,049

(22) Filed: Oct. 17, 2007

Related U.S. Application Data

(60) Provisional application No. 60/890,472, filed on Feb. 17, 2007, provisional application No. 60/954,492, filed on Aug. 7, 2007.

(51) Int. Cl.
*B62K 3/00* (2006.01)
*B62K 19/00* (2006.01)
(52) U.S. Cl. ............................ 280/281.1; 280/274
(58) Field of Classification Search ............... 280/281.1, 280/274, 275, 282, 286, 288.2, 288.3
See application file for complete search history.

(56) References Cited

U.S. PATENT DOCUMENTS

| | | | |
|---|---|---|---|
| 2,949,990 A * | 8/1960 | Douglas et al. ............ 192/217.1 |
| 4,417,744 A | 11/1983 | Spear |
| 4,493,749 A | 1/1985 | Brezina |
| 4,738,551 A | 4/1988 | Chi |
| 4,772,069 A | 9/1988 | Szymski |
| 4,789,176 A | 12/1988 | Carroll |
| 4,856,800 A | 8/1989 | Hashimoto et al. |
| 4,889,355 A | 12/1989 | Trimble |
| 4,900,048 A * | 2/1990 | Derujinsky ................ 280/281.1 |
| 5,016,895 A | 5/1991 | Hollingsworth et al. |
| 5,116,071 A | 5/1992 | Calfee |
| 5,255,932 A * | 10/1993 | Moore ........................ 280/281.1 |
| 5,624,519 A | 4/1997 | Nelson et al. |
| 5,626,060 A | 5/1997 | Lin |
| 5,692,764 A * | 12/1997 | Klein et al. .................... 280/279 |
| 5,944,932 A | 8/1999 | Klein et al. |
| 6,168,179 B1 | 1/2001 | Yu |
| 6,270,104 B1 | 8/2001 | Nelson et al. |
| 6,499,800 B2 * | 12/2002 | Morgan, Jr. ................ 297/195.1 |
| 6,924,021 B1 | 8/2005 | Colegrove et al. |
| 6,955,372 B1 | 10/2005 | Fritschen |
| 6,994,367 B2 | 2/2006 | Mock et al. |

(Continued)

FOREIGN PATENT DOCUMENTS

CH 260468 A 3/1949

(Continued)

OTHER PUBLICATIONS

European Search Report: EP 08 00 2846.

*Primary Examiner* — Kevin Hurley
*Assistant Examiner* — Marc A Scharich
(74) *Attorney, Agent, or Firm* — Ladas & Parry LLP; David C. Brezina

(57) ABSTRACT

An improved all composite bicycle frame has three integral mating portions for the main triangle, asymmetric bottom bracket, improved composite layup, wall thickness, and tube geometry providing lighter weight and increased strength in an economical manner, an improved telescoping seat attachment fitting an integral seat mast and a fork having improved strength, weight and performance properties.

20 Claims, 5 Drawing Sheets

U.S. PATENT DOCUMENTS

| | | | |
|---|---|---|---|
| 7,377,535 B2 * | 5/2008 | Chamberlain | 280/284 |
| 7,407,619 B2 * | 8/2008 | Anthony et al. | 264/516 |
| 2004/0061302 A1 | 4/2004 | Parlee | |
| 2004/0207114 A1 | 10/2004 | Meggiolan | |
| 2005/0006872 A1 | 1/2005 | Mock et al. | |
| 2005/0012299 A1 | 1/2005 | Schuman et al. | |
| 2006/0029317 A1 | 2/2006 | Yamamoto | |
| 2006/0038375 A1 | 2/2006 | Parkin | |
| 2006/0108768 A1 * | 5/2006 | I et al. | 280/281.1 |
| 2007/0079930 A1 * | 4/2007 | Parkin | 156/293 |
| 2007/0289136 A1 * | 12/2007 | Vandermark | 29/897.2 |

FOREIGN PATENT DOCUMENTS

| | | |
|---|---|---|
| DE | 82458 C | 9/1894 |
| DE | 114894 C | 6/1899 |
| DE | 200 05 829 U1 | 12/2000 |
| DE | 202004009268 U1 | 8/2004 |
| EP | 0 148 979 A2 | 7/1985 |
| EP | 0 587 927 A1 | 3/1994 |
| EP | 0618395 | 10/1994 |
| EP | 0 675 036 A1 | 10/1995 |
| EP | 1 378 429 A1 | 1/2004 |
| FR | 441 222 | 8/1912 |
| JP | 5-124564 A | 5/1993 |
| NL | 9200789 A | 11/1993 |
| WO | 98/54046 A2 | 12/1998 |
| WO | 03/089291 A1 | 10/2003 |
| WO | 2004/020272 A1 | 3/2004 |

* cited by examiner

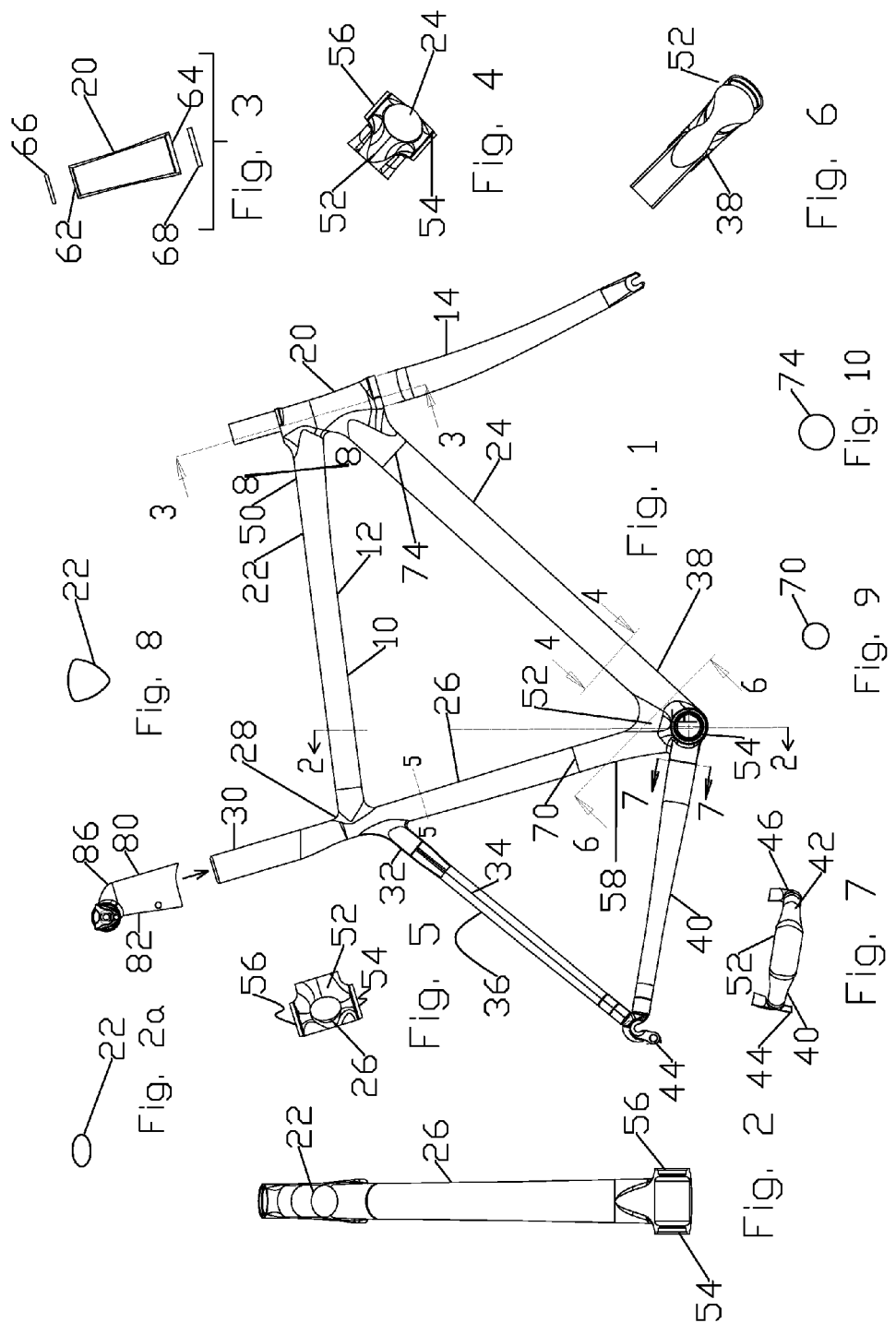

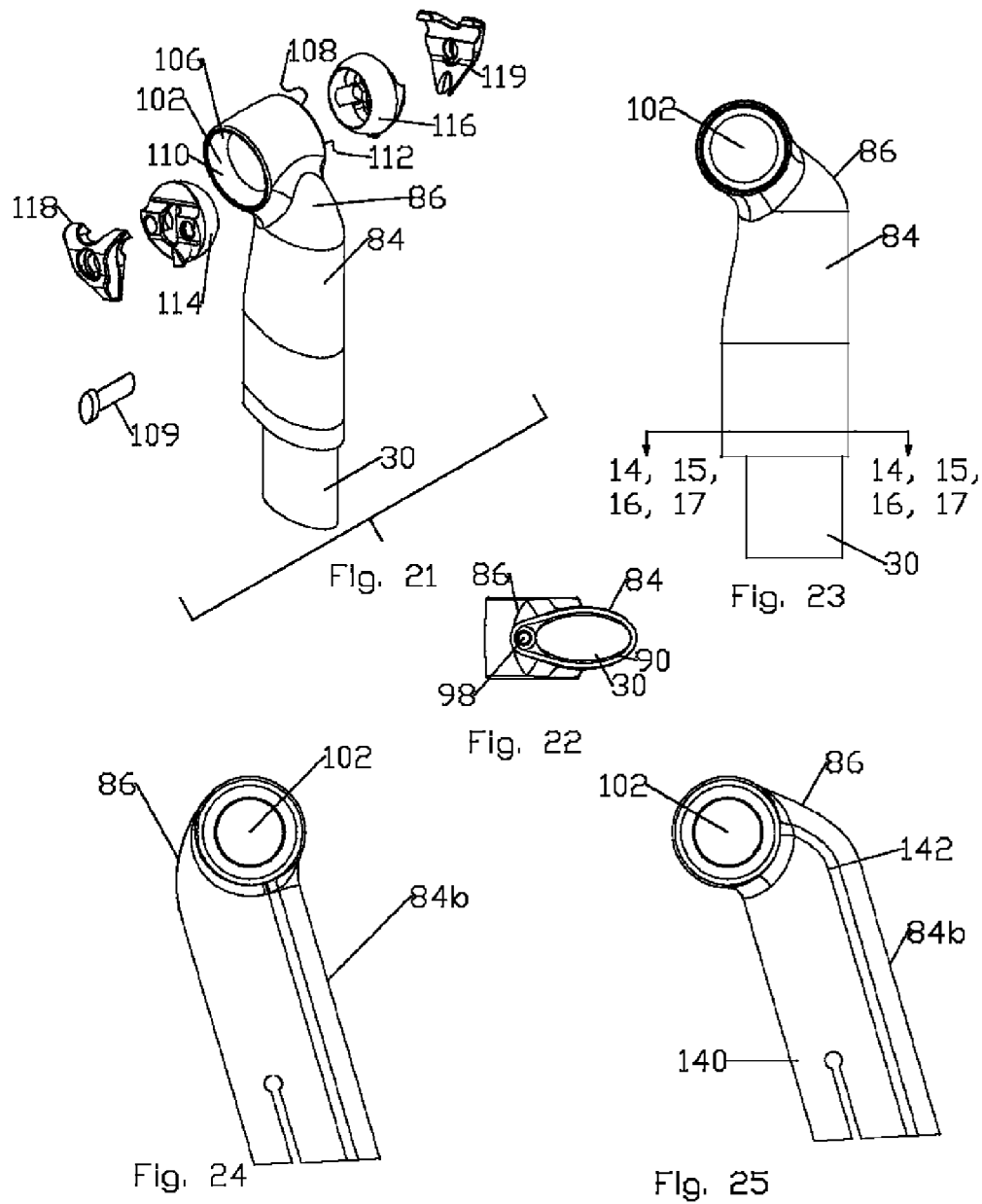

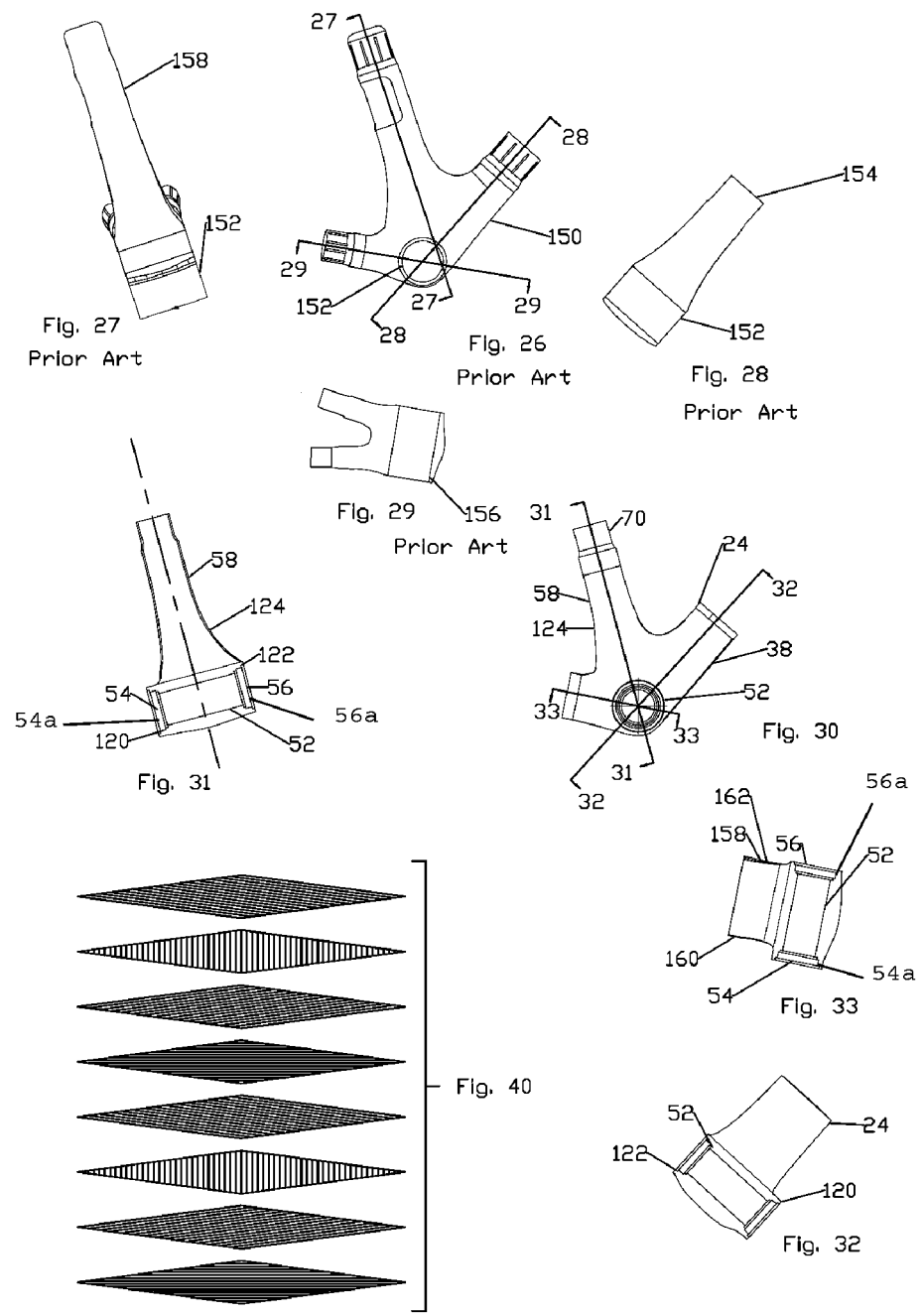

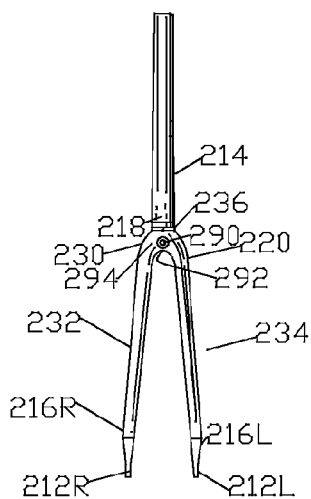
Fig. 34
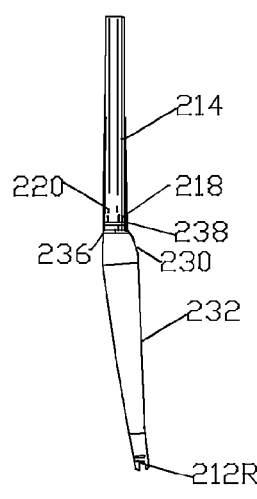
Fig. 35
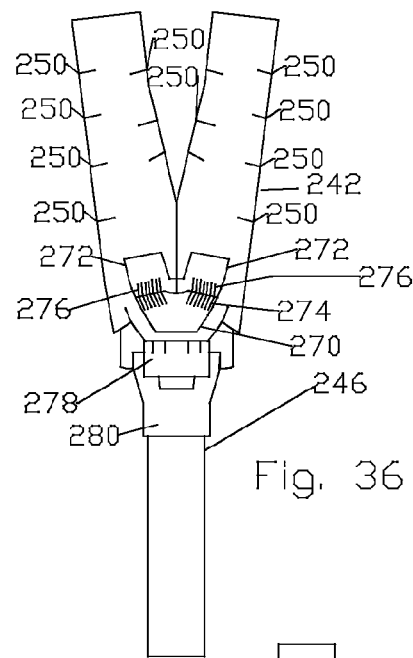
Fig. 36
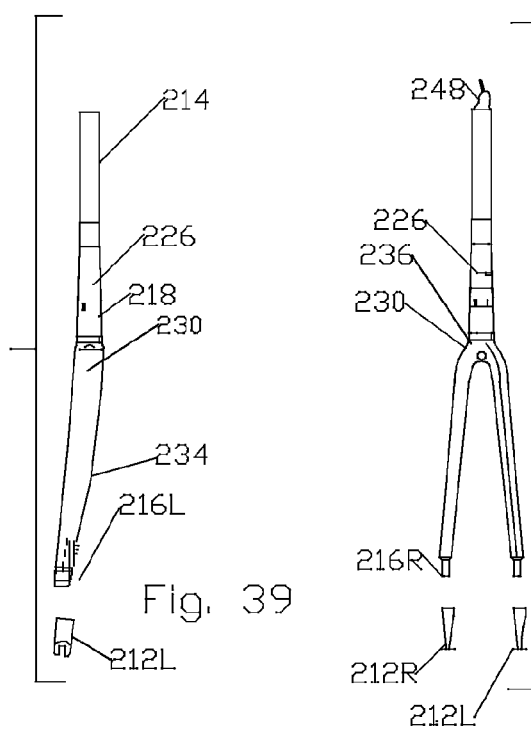
Fig. 39
Fig. 38
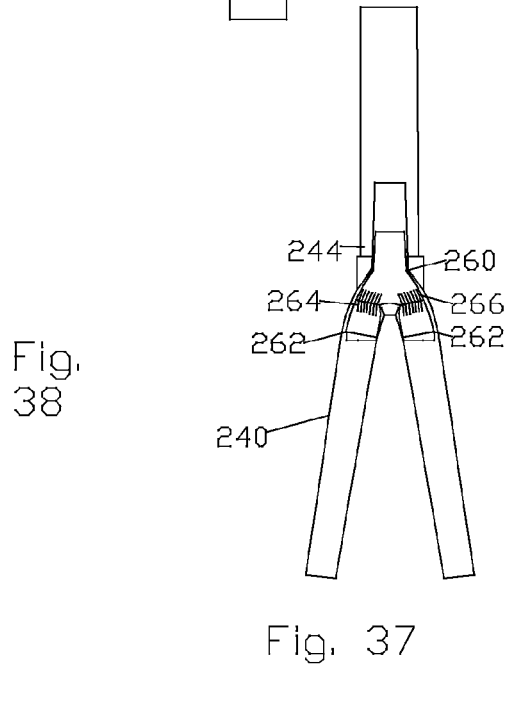
Fig. 37

COMPOSITE BICYCLE FRAME WITH IMPROVED STRUCTURE, GEOMETRY, SEAT ATTACHMENT AND FORK

CLAIM OF PRIORITY

This application claims priority on Provisional Application Ser. No. 60/890,472 filed Feb. 17, 2007, and Provisional Application Ser. No. 60/954,492 filed Aug. 7, 2007, having the same title and inventors as the present application.

BACKGROUND OF THE INVENTION

1. Field of the Invention

An improved all composite bicycle frame and fork has three integral mating portions for the main triangle, asymmetric bottom bracket, improved composite layup, wall thickness, and tube geometry providing lighter weight and increased strength in an economical manner. An improved telescoping seat attachment fits an integral seat mast.

2. Description of Related Art

Basic principles of optimum compaction low void composite molding the bicycle industry are described in Nelson, et al, U.S. Pat. Nos. 5,624,519 and 6,270,104, sharing a common assignee with this application. The disclosures in U.S. Pat. Nos. 5,624,519 and 6,270,104 are incorporated by reference as if fully set forth herein.

Fiber reinforced plastic frame manufacture has evolved several alternative approaches. The above approach uses circular section tubes bonded directly to specially formed high strength lugs. This has an advantage of permitting concentration on the hard to mold, high strength pieces, and the use of standard dimension, machine made tubes, for a high performance, yet economical product. Other approaches were to make a single piece "monocoque" as in Trimble, U.S. Pat. No. 4,889,355, which urged that joints in a composite structure were points of weakness, or to butt join and cover tubes, as in Calfee U.S. Pat. No. 5,116,071 or Colnago, Publication EP 0618395. The disclosures therein are incorporated by reference as if fully set forth herein.

The frame avoids the drawbacks of the prior art using principles of optimum compaction low void composite construction specially adapted to the unique shape and structural requirements of high performance frames using a combination of laminates incorporating fibers at different angles relative to one another, while using the molding techniques to form optimal geometry adapted to maximize strength at minimum weight, improve ride quality and permit advantageous attachment of bicycle componentry. The fork additionally provides impact evidence to the user in the event selected stress levels are exceeded.

BRIEF DESCRIPTION OF THE DRAWINGS

FIG. 1 is a side elevation of the bicycle frame set including frame and fork.

FIG. 2 is a sectional view of the bicycle frame taken at lines 2-2 of FIG. 1 proximate the bottom bracket, looking rearwardly.

FIG. 2a is a sectional view of an alternative embodiment of the top tube of the frame.

FIG. 3 is a sectional view of the bicycle frame taken at lines 3-3 of FIG. 1, proximate the head tube.

FIG. 4 is a sectional view of the bicycle frame taken at lines 4-4 of FIG. 1, proximate the down tube.

FIG. 5 is a sectional view of the bicycle frame taken at lines 5-5 of FIG. 1, proximate the seat tube.

FIG. 6 is a sectional view of the bicycle frame taken at lines 6-6 of FIG. 1, proximate the bottom bracket, looking upwardly and forwardly.

FIG. 7 is a sectional view of the bicycle frame taken at lines 7-7 of FIG. 1, proximate the chainstay assembly.

FIG. 8 is a sectional view of the bicycle frame taken at lines 8-8 of FIG. 1, along the top tube portion.

FIG. 9 is a sectional view of the bicycle frame taken at the bottom joint.

FIG. 10 is a sectional view of the bicycle frame taken at the front joint.

FIG. 21 is a perspective view of an embodiment of the seat cap.

FIG. 22 is a bottom plan view of an embodiment of the seat cap with a wedge adjustment.

FIG. 23 is a side elevational view of an embodiment of the seat cap on the frameset.

FIG. 24 is a side elevational view of an embodiment of the seat cap with a forward offset.

FIG. 25 is a side elevational view of an embodiment of the seat cap with a rearward offset FIG. 26 is an elevational view of a prior art bottom bracket.

FIG. 27 is a sectional view of a prior art bottom bracket, the section being taken at lines 27-27 of FIG. 26.

FIG. 28 is a sectional view of a prior art bottom bracket, the section being taken at lines 28-28 of FIG. 26.

FIG. 29 is a sectional view of a prior art bottom bracket, the section being taken at lines 29-29 of FIG. 26.

FIG. 30 is an elevational view the bottom bracket assembly of the present frame.

FIG. 31 is a sectional view of the bottom bracket assembly of the present frame, the section being taken at lines 31-31 of FIG. 30.

FIG. 32 is a sectional view of the bottom bracket assembly of the present frame, the section being taken at lines 32-32 of FIG. 30.

FIG. 33 is a sectional view of the bottom bracket assembly of the present frame, the section being taken at lines 33-33 of FIG. 30.

FIG. 34 is a front elevation of a fork adapted for use with the frameset.

FIG. 35 is a right side elevation of a fork adapted for use with the frameset.

FIG. 36 is a rear elevation showing the layup of the preforms of a fork adapted for use with the frameset.

FIG. 37 is a front elevation showing the layup of the preforms of a fork adapted for use with the frameset.

FIG. 38 is a left side schematic showing the preforms and comolded components of a fork adapted for use with the frameset.

FIG. 39 is a left side schematic showing the preforms and comolded components of a fork adapted for use with the frameset.

FIG. 40 is a schematic showing the layup of the fiber reinforced layers into laminations.

DETAILED DESCRIPTION OF THE PREFERRED EMBODIMENT

Figure 11:
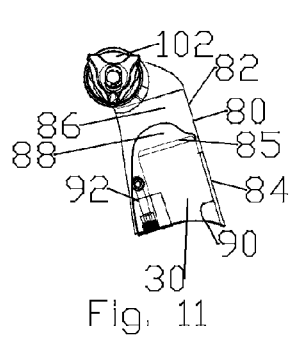
FIG. 11 is a side elevation of the seat cap cutaway to show placement on the mast.
Figure 12:
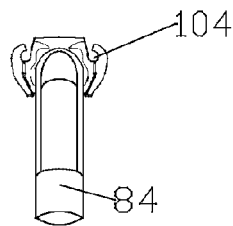
FIG. 12 is a front elevation of the seat cap.
Figure 13:
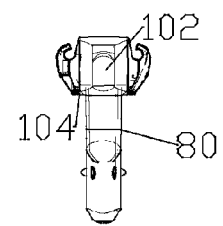
FIG. 13 is a rear elevation of the seat cap.

The bicycle frameset 10 has a frame 12 and front fork 14. The frameset 10 is familiar to one of ordinary skill as the structural portion of the bicycle, excluding component groups of wheels, crank, handlebars, gears, brakes and seat, not shown, which will be added to conform to the rider's preferences. The general layout includes a head portion 20, top tube portion 22, down tube portion 24 and seat tube portion 26 generally analogous to a diamond frame main triangle, however certain additional advantages will be recognized by the particular subassemblies used to form these members.

The fibers are aligned in laminations such as taught in U.S. Pat. Nos. 5,624,519 and 6,270,104 sharing a common assignee with this application. By using a series of 0-45-90 degree alignments, the high strength and high modulus properties of carbon fiber can be used to advantage to produce a shape of complex curvature having substantially uniform strength in the needed directions in the finished structure, while the optimum compaction and low void methods, as improved for high performance frames as taught herein, produces the finished structure having a substantially uniform density. Optimum fiber areal weights substantially above the industry standards are also permitted by the product and process taught herein.

A cruciform seat support subassembly 28 includes the seat tube portion 26, an upwardly extending seat mast 30 and downwardly and rearwardly extending monostay 32 for supporting a pair of seatstays 34, 36. In this manner, the functions of a traditional lug and tube are combined into an improved single unitary structure.

The seat tube portion 26 of seat support subassembly extends downwardly and is bonded to bottom bracket subassembly 38. Extending rearwardly from bottom bracket subassembly 38 is a pair of chainstays 40, 42. Chainstays 40, 42 intersect seatstays 34, 36 at respective dropouts 44, 46. Thus the integral subassembly 38, down tube 24 and monostay 32 perform the functions of a traditional lug and tube but in an improved single unitary structure.

Similarly, head portion, 20 and top tube portion 22 are formed in a single head subassembly 50. This receives down tube 24 and joins seat support subassembly, thus forming the complete diamond frame 12.

As shown in FIGS. 2, 4 and 5, bottom bracket portion 52 of bottom bracket subassembly has a drive side bearing seat 54 and a non-drive side bearing seat 56. U.S. Pat. No. 6,924,021 teaches a method of molding a complex shape from a combination of unidirectional and random directional fiber reinforced plastics. These teachings can be adapted to the formation of bearing seats in the frame as taught herein that can receive slip fit bearings, the bottom bracket portion 52 being molded in a manner such that little or no machining will be required to receive the bearings. This patent is incorporated by reference as if fully set forth herein.

In keeping with optimum compaction, low void formation of fiber reinforced composite subassemblies, this is a hollow, thin walled composite. The geometry of portion 52 is such that relative to the upwardly extending joining portion 58 and seat tube portion 26, there is asymmetry, such that the differential load on the driving side of the bicycle is better absorbed for and improved balance of rider power transmission through the gear and chain system (not shown) with stiffness and comfort. Comfort, for a high performance bicycle, has different considerations than for a recreational consumer bicycle, wherein a competitor may prioritize power transmission greatly, yet nevertheless can advantageously utilize reduced fatigue over a long race. Thus, there is a continued balance of strength, stiffness, weight and plasticity in which subtle geometric changes provide far more sophisticated performance than mere cosmetic or design choices. The respective seats 54, 56 receive the bearings internally, unlike traditional and earlier composite prior art bottom brackets, which received a bonded or comolded metal seat threaded inserts which received threaded metal bearing cups. In alternative prior art bottom brackets, non-threaded composite cups were bonded or cold molded. Because the prior art metal bearing seats were bonded, excess, non-structural, hence heavier, materials resulted. In the present frame a complete bearing is seated on each side with a slip fit dispensing with the prior art inserts or bearing cups. The precision molding of bearing receiving stepped and annular surfaces 54 a and 56 a, and slip fit enabled thereby, permit a user to manually remove, recondition or replace the bearings without any tools, once the crank arms are removed. Press fit bearings could also be used, the structure having sufficient precision to receive such bearings without separate inserts or cups. An additional advantage is that the spacing between the walls and the perimeter of the seats 54, 56 is permitted to be much closer with an all-internal bearing received entirely within seats. The dimensions necessary for fitment of traditional components detract from optimizing the strength of the structure. Overall this permits a significantly wider spacing of the bearings, formation of a wider diameter seat tube and wider spacing of the chainstays, all combining to provide a superior structure with a lower mass.

FIG. 4 shows the wall of down tube portion 24 to be formed with an elliptical section, hollow thin wall, with the longer axis aligned transversely for improved power transmission by the rider, as complex, but largely transverse loads are applied while pedaling, but with the shorter axis aligned coplanar with the longitudinal axis of the frame, permitting slightly greater absorption loads imposed by the road surface. Similarly, FIG. 5 shows a similar elliptical section, with similar alignment considerations.

As shown in FIG. 3, head portion 20 has a top bearing seat 62 and a lower bearing seat 64. In keeping with optimum compaction, low void formation of fiber reinforced composite subassemblies, this is a hollow, thin walled composite. Bearing seat 64 is preferably of larger diameter than upper bearing seat 62 to permit greater strength where the higher load is received from the fork 14. Additionally, the respective seats 62, 64 receive the fully encapsulated, differential sized upper bearing 66, and lower bearing 68 internally, directly in head portion 20, unlike traditional and earlier composite prior art head tubes, which received a bonded metal seat which itself provided a bearing surface. Because the prior art metal bearing seats were bonded, excess, non-structural, hence heavier, materials resulted. In the present frame a complete bearing assembly is seated, without the need for a separate race in which loose or caged bearings rotate. Like the bottom bracket bearings discussed above, a slip fit is enabled, permitting manual removal and replacement once the fork is removed.

The joints between subassemblies, bottom joint 70 between seat support subassembly 28 to bottom bracket subassembly 38, top joint 72 between seat support subassembly 28 and head subassembly 50, and front joint 74 between head subassembly 50 and bottom bracket subassembly 38 are spaced such that these secondarily bonded joints avoid the locations of high stress in the structure.

FIG. 7 shows the sectional shape of the lower region of bottom bracket portion 52 as it projects rearwardly to join chainstays 44 and 46. The wall of this hollow member on the drive side is aligned flatter, while the non-drive side wall has a greater curvature, as described more detail with respect to the discussion of FIG. 33 later in this application. This better resists force transmission by a chain from bottom bracket portion 52 to a wheel mounted in dropout 44.

The sectional shape of the forward portion of the top tube portion is a rounded triangular shape, as shown in FIG. 8. This permits the generally horizontal component of the top wall to better resist side to side motion imparted as the rider pedals, holding the handlebars, while the lower two walls react better to road induced shock. This also coacts with the headtube having differential sized bearings and the mating fork which therefore has a larger diameter near the fork crown.

The sectional shapes at joints 70 and 74 are generally circular, as shown in FIGS. 9 and 10, respectively. At these locations, stresses require less directional alignment of the wall shapes. Additionally, there can be more advantageous component attachment arrangements used for joint 70, typically located proximate the location where a front derailleur may be expected to be mounted.

As an example, as shown in FIG. 2a, head portion 20 and top tube portion 22, which form single head subassembly 50 can be adapted for particular strength and flexibility requirements, such as where the middle section, midway between seat subassembly 28 and head portion 20, can have a shorter vertical dimension than the elliptical section of portion 22 as shown in FIG. 2, thereby providing increased vertical flexibility for greater comfort and reduced fatigue, while preserving lateral stiffness to maintain power transmission from the handlebars to the pedals and rear wheel.

The highest strength is in the formed portions permitting economical and high quality manufacture of smaller parts, without either the wasted material of the reinforced butt joint method of making a composite bicycle frame, or the difficult quality issues in forming a one-piece monocoque diamond frame.

A frame 12 formed in the manner described can be formed using optimum compaction, low void laminations, ranging from 4 ply laminations in low load areas, up to 12 ply laminations in high load areas, with spot reinforcements as needed. Such a frame 12, sized as a nominal 56 cm seat tube length, can be formed with a mass of about 830 gm when complete with sufficient strength and stiffness and comfort for elite competition. Thus a sub-900 gram production bicycle frame, suitable for road competition use is feasible when formed with the geometry and the methods described herein, and in the patents incorporated by reference. Indeed, the selective use of higher modulus fibers in strategic areas may be expected to render, a sub-800 gram frame feasible.

A novel seat mast 30 and seat cap 80 provide improved strength, weight, aerodynamics and adjustability. Cap 80 is formed from a fiber reinforced plastic shell 82 having a wall 84 and top portion 86, wall 84 defining an interior chamber 88 having surface 90 which closely corresponds to the exterior surface of mast 30. In this manner cap 80 telescopes on mast 30 for seat height adjustment.

Figure 16:
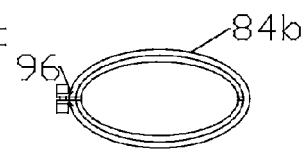
FIG. 16 is a bottom elevation of a third embodiment of the seat cap.
Figure 17:
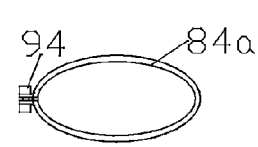
FIG. 17 is a bottom elevation of a fourth embodiment of the seat cap of the invention.
Figure 18:
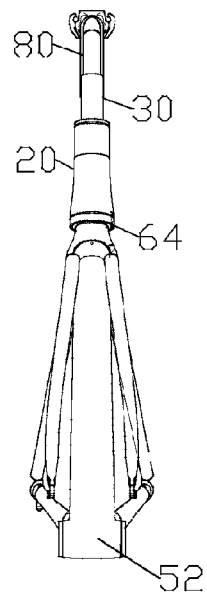
FIG. 18 is a front elevation of the frameset.
Figure 19:
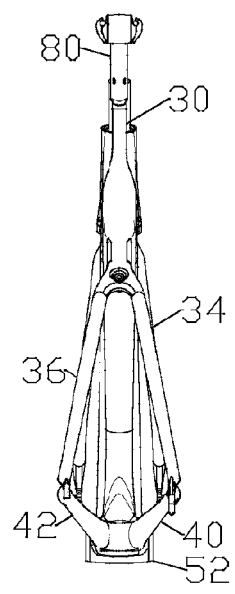
FIG. 19 is a rear elevation of the frameset.
Figure 20:
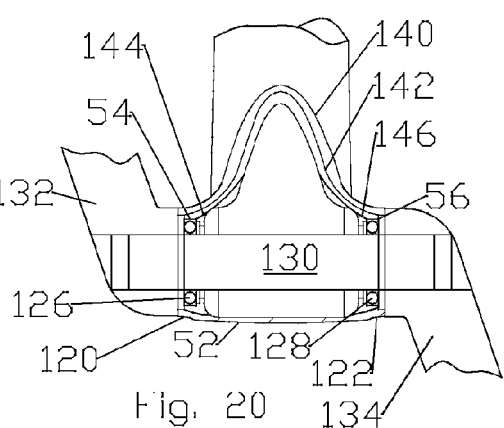
FIG. 20 is an enlarged sectional view of the bottom bracket corresponding to the section shown in FIG. 2.

Cap 80 is maintained in a selected vertical position by a locking member 92 which may be formed in a number of alternative ways. In one embodiment, as shown in FIG. 17 wall 84a is slotted at the rear and a bolt 94 directly compresses the side portions to clamp mast 30. A functionally related fastening solution as shown in FIG. 16 would be to utilize a metallic band and bolt assembly 96 to provide compression of slotted wall 84b.

Figure 14:
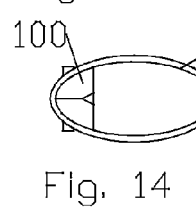
FIG. 14 is a bottom elevation of a first embodiment of the seat cap.
Figure 15:
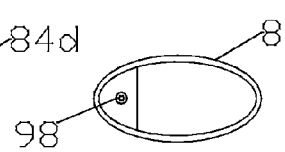
FIG. 15 is a bottom elevation of a second embodiment of the seat cap of the invention.

Alternatively, internal wedging members, such as using a single wedge and bolt assembly 98, in FIG. 15 with wall 84c adapted to receive assembly 98, or alternatively a plurality of wedges and bolt assembly 100, with wall 84d could be used as shown in FIG. 14. The former is much like a traditional handlebar stem, while the latter would likely provide the most compact external dimensions.

Mast 30 and accordingly cap 80 are formed in an elliptical cross section. Top portion 86 has an aperture 102 which receives a seat rail clamping assembly 104 in a configuration formed to capture the support rails on a standard bicycle seat. In alternative embodiments a section can be adapted with elliptical segments, but generally analogous to a teardrop shape. The cap 80 coacts with mast 30 in supporting a bicycle seat. Mast 30 is formed of continuous, hollow walls as a part of subassembly 28 but unlike those joiner portions of subassembly 28 that are formed openly so as to permanently receive a mating seatstay assembly, head and top tube 22 subassembly and bottom bracket subassembly 38, mast 30 is completely closed by a top wall 85. This provides a structural advantage in that the otherwise hollow fiber reinforced plastic shell of mast 30 better resists the clamping forces imparted when tightening the bolt or clamps on assembly 104. By comparison, prior art frames with upwardly projecting fairings for receiving a traditionally configured seat post are hollow at the top.

Clamping assembly 104 takes advantage of the ability to precisely form top portion 86 molding with a combination of unidirectional and chopped strand fibers. Seat rail clamping assembly 104 operates in a manner analogous to a ball and socket joint in that greater adjustment is permitted than would be the case with a standard seat post clamp. Prior art seat posts are cylindrical, thus some angular adjustment is permitted around a substantially vertical axis. Mast 30 and cap 80 are fixed around this axis. Forming aperture 102 to have curved walls 106, 108 define right and left side sockets 110, 112. Sockets 110, 112 matingly receive spherical interior seat clamping members 114, 116. Outer clamping member 118, 119 capture a pair of seat rails against clamping members 114, 116. These can be held in place by a fastener arrangement 109 such as nut and bolt, a pair of nuts on a threaded shank, bolts fitting into a threaded member, or the like. The spherical or curved walls 106, 108 permit a level of angular adjustment about a substantially vertical axis as well as the angular adjustment about a transverse axis permitted by prior art seat clamps.

The seat mast 30 and arrangement of cap 80 of the frame using a seat mast 30 of approximately 95 cm long allows about 60 mm of vertical seat adjustment without the need to cut the mast 30. The ability of the cap 80 to fully telescope, while maintaining a substantial portion of surface 90 in contact with the outer surface of mast 30, permits this 60 mm of adjustment with a standard cap 80. This compares favorably with prior art having seat adjustment of 40 mm with an internally mounted cap or prior art with an externally mounted cap having an adjustment of 30 mm. An additional benefit of the relatively short mast is easier packing and shipping of the bicycles.

Multiple support lengths can be provided to increase adjustment range. A taller cap such as that shown in FIG. 25 offers an additional 40 mm of height adjustment. An additional embodiment enables multiple offsets for the seat rail clamping mechanism. Thus, the cap 80 can be formed and arranged to permit an offset of 20 mm back, such as in FIG.

25, 5 mm back and 10 mm forward such as in FIG. 24. FIGS. 24 and 25 also show the slotted wall adapted to securement with a metallic band and bolt assembly 96. FIGS. 24 and 25 illustrate operative ranges and different combinations of height and offset could be adapted within these ranges. Prior art systems typically offer a single offset.

The combination of elliptical shape, the smooth outer surface of wall 84 and top portion 86 provide, in addition to the secure seat positioning, an improved aerodynamic flow over this portion of frame 12, as compared to traditional seat post arrangements. Additionally, the efficient clamping action enables further weight savings.

FIGS. 20, 30, 31, 32 and 33 illustrate the bottom bracket particularly the wall geometry and bearing seat arrangement. Bottom bracket 52 is formed with laterally projecting cylindrical walls 120, 122 and upstanding seat tube base 124 which forms the intersection with tapered seat tube 26. Seat tube 26 tapers at a substantially constant angle inwardly and upwardly from the location where seat support subassembly 28 joins bottom bracket subassembly 38 up to the region where mast 30, monostay 32 and the joiner which receives top tube 22 intersect. As such, a complex shape with non-developable, compound curvature enables optimal structure for subassembly 28. Seat support subassembly 28 in turn intersects top tube 22 and mast 30. Incorporation of subassembly 28 enables design for maximum efficiency as compared to the prior art which also designed around receipt of a cylindrical seat post.

In the prior art the seat tube—bottom bracket intersection was typically accomplished by either metal lugs, welds or by tapering only a lower portion of the seat tube, such as taught in the Nelson patents cited herein. These arrangements typically had bearing races or cups as separate components installed in the bottom bracket which received separate bearing assemblies that supported a rotating crank spindle. Another alternative was to have cartridge spindle assemblies, but these were also typically held in place by threaded cups engaging the cylindrical walls of the bottom bracket. Excess material provided engagement with the bearing races or cups and additionally was added for lateral stiffness to resist twist imposed by pedaling forces.

Forming the bottom bracket in accordance with the teachings herein, lighter yet stronger and stiffer structure locates bearings 126, 128 directly within seats 54, 56. Bearings 126, 128 support spindle 130 which is rotated by crank arms 132, 134. Forming bottom bracket 52 using the teachings herein enables a plurality of unidirectional fiber reinforced laminations 140, 142 in conjunction with chopped strand filled regions 144, 146 to precisely form seats 54, 56 in cylindrical walls 120, 122 for slip fit of bearings 126, 128 or direct press fit without inserts or cups.

As shown, seats 54, 56 are themselves formed to have an array of stepped cylindrical walls and annular surfaces to receive bearings 126, 128, spindle 130 and such additional shims, washers and fasteners as will be adapted to retain substantially standardized length spindle and bearing or cartridge assemblies as can use standard, high quality cranksets. Because of the recessed position of seats 54, 56, fully captured within walls 120, 122, however, the shell structure of bottom bracket 52 can be made substantially wider than the prior art, thereby providing improved support for the spindle. Improved mechanical support therefore enables lighter materials with increased performance.

FIG. 25 is a side elevational view of an embodiment of the seat support cap of the frame on the frameset with a rearward offset and 100 mm height adjustment. A maximum height limit 140 indicates the location where the top of mast 30 can be aligned yet still maintain sufficient contact for support 80 to be fastened and maintain a selected height. A minimum height limit 142 indicates the range of adjustment. A shorter support 80 could save weight where the rider did not need the maximum height extension available.

Bicycle bottom brackets in particular are dimensionally constrained by the need to receive chainstays 40, 42 having sufficient clearance for standard wheels and by receiving crank assemblies 132, 134 which are dimensionally constrained by ergonomic considerations. There are, therefore, minimum internal clearances for chainstays 40, 42 and maximum width for the spacing of pedals and the angle of crank arms.

In the prior art bottom bracket 150 as shown in FIGS. 26, 27, 28 and 29, the maximum width of cylindrical portion 152 from outside edge to outside edge of bottom bracket 150 was further constrained by the need to receive threaded bearing cups and for those cups to project a sufficient dimension to receive tools needed for fitting or removal. Typically the outer dimension of the prior art bottom bracket between the outer edges of the laterally projecting walls of cylindrical portion 152 of FIGS. 27, 28 and 29, was about 68 mm. Exceeding this dimension would have resulted in greater than acceptable spacing of the pedals for the typical rider and inability to use many standard crank spindles.

Loads imparted by pedaling, particularly when out of the saddle such as when climbing or sprinting and the rider is supported only by the hands and feet, are transmitted through handlebars and the headset substantially through the main tube or down tube portion 154 to the bottom bracket, spindle, bearings, crank arms. Because the width of the bottom bracket was constrained, the width of the main tube or down tube portion 154, in FIG. 28 was also constrained. The width of head tube 20 is also limited the width of down tube 24. Prior art down tubes might have tapered somewhat, but were typically constrained to about 45-50 mm wide along most of their length. The greater range provided by the combined geometry of the frame taught herein permits optimization of strength, stiffness and comfort resulting from the specific form and structure of down tube 20.

The outside dimensional constraints also provided a limitation on the width of the chainstays 40, 42 because there must be sufficient clearance to receive a bicycle wheel. The spacing between the outer walls chainstay array 156 shown in FIG. 29 and was typically about 55 mm.

FIG. 27 shows prior art bottom bracket 150 with the section being taken at lines 27-27 of FIG. 26. It will be noted that seat tube 158 has an axis that does not intersect the rotational axis of the crank spindle in cylindrical portion 152. The geometry of prior art frames, without the cruciform seat mast of the present frame, was constrained by strength, weight, ride comfort and power transmission considerations. The width of the prior art seat tube 158 which extended upwardly to receive a standardized cylindrical seat post, was typically about 35 mm.

FIG. 30 is an elevational view of the bottom bracket subassembly 38 of the present frame. FIG. 31 is a sectional view at lines 31-31 of FIG. 30. This view shows the asymmetry of and full width of joining portion 58 in which wall 120 of bottom bracket portion 52 extends substantially farther than wall 122 to provide clearance for a bicycle chainwheel and mounting and alignment for a bicycle front derailleur. Because bearing seats 54, 56 are recessed for slip fit, the entire width, extending from the edges of wall 120 to wall 122 is structural—not used by bottom bracket bearing cups like prior art frames. Thus, a designed dimension of 90 mm can be used, an increase of about one-third. This greater width also permits a wider seat tube portion 26, a designed width of 75 mm. This is more than double the typical prior art seat tube width.

FIG. 32 shows in particular the arrangement that permits down tube 24 to be extended close to the full width of bottom bracket portion 52 to a designed width of 75 mm. An asymmetry can be built in to maximize strength while enabling fitment of substantially standard crank assemblies, chainwheels and front derailleur. The width increase is a little over one third greater than the typical prior art down tube. The down tube 24 and seat tube portion 26 can be designed to the same width, a departure from the prior art substantially reducing lateral flex of the frame, without weight penalty.

FIG. 33 shows the chainstay receiving portion 158 of bottom bracket assembly 38. This portion 158 can function somewhat like a seat monostay receiving a wishbone like chainstay assembly. Side walls 160, 162 can be asymmetric, as shown in FIG. 33 and the sectional view of FIG. 7, to tune frame performance due to differences in load on the drive side and non-drive side. Thus drive side wall 160 can be substantially vertical while wall 162 can be inwardly tapered. Additionally walls 160, 162 are widely spaced, to near the full width of bottom bracket portion 52. The outer walls of chainstays 40, 42 can be spaced 75 mm apart, compared to the typical prior art 55 mm spacing, an increase of more than about one third.

A completely hollow, fiber reinforced plastic, bicycle fork 14 has comolded dropouts 212L and 212R and an integral steer tube 214. In a portion of the laminations, continuous fibers in the fork extend upwardly from the tips 216L and 216R to steer tube base 218. The fiber reinforced plastic structure extending in this manner is referred to as the shell 220. Base 218 can be a partial, tapered plastic member, or can extent the entire height of the steer tube, completely encapsulating tube 214. In a front impact, as in a crash, it is believed that load imparted on dropouts 212L and 212R—transmitted through the wheel mounted thereon—transferred through blades 232, 234 acts directly on the bearing seat 236 mounted in the bicycle frame 12, which carries most of the mass—the rider. The inertia effectively bows the structure defined by tube 214 and tube base 218 because the rider's hands are on the handlebar, attached to tube 214. Thus extension of base 218 and tailoring of the laminations can improve the fork properties.

Formed integrally on fork 14 is bearing seat 236. In a manner analogous to that described for the frame, the bearing seat 236 is fully formed in the fiber reinforced plastic. High precision is obtainable using bladder molding. If desired because of the shape of the bearing seat 236, filler, such as carbon fiber or particles, could be used. The main structural laminations provide adequate strength so that filler is only needed, if at all, to support the bearing. Another example of a method of molding a complex shape from a combination of unidirectional and random directional fiber reinforced plastics is taught in U.S. Pat. No. 6,924,021. Consistent with the teachings regarding the frame, and particularly the head portion 20, the assembly comprising the tube 214, base 218, fork crown 230 and crown to steer tube transition zone 238 are formed to permit fitting of an oversized lower bearing—adjacent the crown 230. Preferably the top bearing is dimensioned at 1⅛ inch and the bottom bearing at 1½ inch. All these portions of the fork a smoothly and integrally molded. Prior art bearing seats typically involved either bearing races that directly received bearings, such as ball bearings, or metallic sleeves and/or pressed in or bonded in composite sleeves that received sealed bearings. Those additional components are eliminated by precision molding and slip fit bearings.

The use of differential sized top and lower headset bearings 66, 68, particularly the larger dimensioned lower bearing 68, permits advantageous adaptation of the strength properties of the materials with the geometry of the hollow shell 220. As described in connection with the frame, the bearings are a slip fit, requiring no tools for removal or replacement once the fork is removed from the head tube. Both headset tools and bottom bracket tools, required by the prior art, are particularly cumbersome due to the required dimensions. Elimination of the need for such tools provides a significant advantage.

The general layup will be described, particularly pointing out the form and arrangement of the plies that provide the impact evident feature of the invention. As with the frame, the unidirectional layup of FIG. 40 provides an advantageous wall structure and can be reinforced as taught herein.

The prepreg materials which will form shell 220 are assembled comprising a front lamination 240 and rear lamination 242 in FIGS. 36 and 37 respectively. Each lamination is made up of layers of unidirectional fibers with the fibers oriented at selected axes as taught in Nelson, et al, U.S. Pat. Nos. 5,624,519 and 6,270,104. At least one primary layer 244, 246 in each lamination 240, 242 will be formed so that a plurality of individual continuous and overlapping unidirectional fibers extend the entire length of fork 14. These laminations will be overlapped and assembled together prior to curing, surrounding a bladder 248, to form the precuring shapes of FIG. 38, 39. The preform shapes of FIG. 36, 37 are prepared surrounding the bladder and will be placed in a female mold, the bladder inflated and the resin cured.

Appropriate slits 250 on lamination edges enable overlapping of tab edges when a lamination is on an outside curve, as would be the rear lamination 242. On an outside curved lamination, this tab overlap provides additional thickness and strength and slightly alters the angular orientation relative to a curved axis conforming to the forward curvature of the fork blades 232, 234.

Strength is increased by the addition of reinforcing laminations, particularly proximate the crown 230, transition zone, 236 and steer tube base 218. Reinforcing preform arrangements 260, 262 each comprise an upper and lower ply. The arrangement of front reinforcement with upper 260 and blade reinforcements 262 reveals darts 264, 266 formed in a non-overlapping manner to define impact evident reinforcement zones. Similarly, reinforcements 270, 272, are also arranged with darts 274, 276 to define impact evident reinforcement zones. Additional reinforcements 278, 280 provide strength in high load areas. These are illustrative, and depending on the expected use of the forks, additional reinforcements can be added during layup. The figures illustrate the layups described in an inverted manner, for better illustration. In forming the structures, the reinforcements, 260, 262, 270, 272, 278, 280, will preferably be placed first in opposing female molds, so that the reinforcements are on the outer portion of the finished fork and primary layers 244, 246 last, adjacent the bladder, so that the full length unidirectional fibers will be in laminations on the inside of the finished fork 14.

It is well known that strength and yield properties of high performance materials used in bicycles are such that, unlike less sophisticated materials like steel, when rider error causes a crash inspection and potential replacement is advised. This is not limited to bicycles made of carbon fiber reinforced plastic, but includes aluminum, exotic metals such as titanium, sophisticated alloys, and the use of other fiber reinforcements in various different matrices. The properties of the fork described are more than adequate for normal use. The impact evident zones provide an extra benefit in that while the fork may remain intact, the nonoverlapping darts, providing fiber discontinuity, will provide visual evidence due to resulting discontinuity in the cosmetic surface of the finished fork 14.

FIGS. 36 and 37 show schematically the arrangement of the components in a pre-curing assembly stage. Tube 214 transitions to base 218 in zone 236 to crown 230 and thence to fork blades 232, 234 ending in tips 216L and 216R. If desired, a metallic insert could be use in tube 214, to assist in mechanical attachment of a handlebar stem, or extending farther into base 218 and zone 236, to provide different material properties in these high load areas. Dropouts 212L and 212R, respectively, are fitted with appropriate adhesive, placed in a mold and comolded.

The direct engagement of bearing 68 on seat 226, when the fork is properly installed, couple with material strength and shell geometry has an additional functional advantage of permitting an improved location for brake mount 290 to be located more advantageously—effectively lower and closer to the lower wall portion 292 in the brake bridge portion 294 of shell 220. As described above, an additional feature coacting with the properties of shell 220 is the use of different sized slip fit bearings 66, 68. The lower bearing 68 is a larger dimension in the location of higher loads. A fork fitted to a 56 cm frame, supported by a 700 C wheel can be formed consistent with this method and structure having a mass believed to be less than or equal to 350 gm.

While the present frame has been disclosed and described with reference to particular embodiments and customary industry terminology thereof, it will be apparent, as noted above, that variations and modifications may be made therein. It is, thus, intended in the claims to cover each variation and modification that falls within the true spirit and scope of the present frame.

In accordance with our invention, we claim:

1. An improved substantially all composite bicycle frame of a diamond configuration geometrically formed to have a longitudinal axis, a head tube axis, a seat tube axis, a down tube axis and a bottom bracket axis, having a main triangle and rear triangle, said triangles being joined at the seat tube axis, a seat attachment arrangement, a crank attachment arrangement, and a fork attachment arrangement, the improvement comprising:

the main triangle formed of a first integral mating portion, a second integral mating portion and a third integral mating portion;

the rear triangle formed of a seat stay structure and a chainstay structure;

the crank attachment arrangement being an asymmetric bottom bracket aligned with the bottom bracket axis and perpendicular to the seat tube axis;

said crank attachment arrangement having a drive side bearing seat adapted to directly receive a drive side bearing therein and a non-drive side bearing seat adapted to directly receive a non-drive side bearing therein such that said non-drive side bearing seat is spaced farther from said seat tube axis than said drive side bearing seat;

the seat attachment arrangement being an integral seat mast receiving a telescoping seat cap;

the fork attachment arrangement being a head structure aligned with the head tube axis;

said head structure having an upper fork bearing and a lower fork bearing, the head structure directly and coaxially receiving said upper and lower fork bearings therein, said lower fork bearing being of a diameter larger than said upper fork bearing;

said first integral mating portion being a cruciform seat support subassembly including a seat tube portion, an upwardly extending seat mast, a downwardly and rearwardly extending seatstay joiner for receiving the seatstay structure and a top tube joiner so that the functions of a traditional seat lug and seat tube are combined into a single unitary structure;

said seat tube portion of first integral mating portion extends downwardly and is bonded to said second integral mating portion;

said second integral mating portion being a bottom bracket subassembly having an upwardly extending seat tube joiner, a down tube portion, a bottom bracket member and chainstay joiner;

said seat tube joiner being formed of continuous hollow walls having a seat tube width relative to said seat tube axis and longitudinal axis;

said bottom bracket member extending from a drive side edge to a non-drive side edge to define a bottom bracket width;

said bottom bracket width being substantially greater than said seat tube width and said seat tube joiner depending asymmetrically outwardly from said seat tube width to said bottom bracket width;

said chainstay joiner projects rearwardly to join chainstays;

said chainstay joiner is formed to have a drive side wall and a non-drive side, said drive side wall is substantially flat and said non-drive side has a curvature relative to said drive side wall to better resist force transmission by a chain extending between a crank mounted to said bottom bracket and a wheel mounted at the end of the chainstays;

said second integral mating portion extending from said bottom bracket subassembly with a down tube portion to join said third integral mating portion;

said third integral mating portion having a head segment, and top tube portion formed in a single head subassembly and a down tube joiner adapted to receive down tube portion of said second integral mating portion and said top tube portion adapted to join said seat support subassembly, to form the complete diamond frame;

said head segment has an upper edge and a lower edge and is formed and arranged so that said upper bearing seat and lower bearing seat have walls inward from said upper and lower edges and are fully defined for receiving upper and lower bearings directly therein;

said seat mast telescopingly receives an elliptical seat cap formed from a fiber reinforced plastic shell having a cap wall and top, said cap wall defining an interior chamber having a surface which closely corresponds to an exterior surface of said mast, said cap telescoping on said mast for seat height adjustment;

a fork is fitted to said head structure for rotation about said head tube axis, said fork having a steer tube with a top end and a lower bearing seat, a fork crown and blade terminating in a tip, and being formed substantially entirely of fiber reinforced plastic made up of a plurality of layers formed in laminations in which at least one layer is formed of unidirectional fibers in which a plurality of said fibers in said layers extends the entire length of said fork from said tip to said top end and passing through said fork crown;

said fork is formed to have additional reinforcements proximate said fork crown in which said reinforcements strengthen said fork crown but also provide evident areas of stress in the event selected loads are exceeded;

said seat cap terminates in a top having a transverse aperture, said transverse aperture having transversely opposed beveled walls, said beveled walls receiving a seat clamp mechanism formed to mate with said walls and provide seat angle adjustment by rotation about more than a single axis.

2. An improved substantially all composite bicycle frame of a diamond configuration geometrically formed to have a longitudinal axis, a head tube axis, a seat tube axis, a down tube axis and a bottom bracket axis, having a main triangle and rear triangle, said triangles being joined at the seat tube axis, a seat attachment arrangement, a crank attachment arrangement, and a fork attachment arrangement, the improvement comprising:

the main triangle formed of a first integral mating portion, a second integral mating portion and a third integral mating portion;

the rear triangle formed of a seat stay structure and a chainstay structure;

the crank attachment arrangement being an asymmetric bottom bracket aligned with the bottom bracket axis and perpendicular to the seat tube axis;

said crank attachment arrangement having a drive side bearing seat adapted to directly receive a drive side bearing therein and a non-drive side bearing seat adapted to directly receive a non-drive side bearing therein such that said non-drive side bearing seat is spaced farther from said seat tube axis than said drive side bearing seat;

the seat attachment arrangement being an integral seat mast receiving a telescoping seat cap;

the fork attachment arrangement being a head structure aligned with the head tube axis;

said head structure having an upper fork bearing and a lower fork bearing, the head structure directly and coaxially receiving said upper and lower fork bearings therein, said lower fork bearing being of a diameter larger than said upper fork bearing;

said first integral mating portion being a cruciform seat support subassembly including a seat tube portion, an upwardly extending seat mast, a downwardly and rearwardly extending seatstay joiner for receiving the seatstay structure and a top tube joiner so that the functions of a traditional seat lug and seat tube are combined into a single unitary structure;

said seat tube portion of first integral mating portion extends downwardly and is bonded to said second integral mating portion;

said second integral mating portion being a bottom bracket subassembly having an upwardly extending seat tube joiner, a down tube portion, a bottom bracket member and chainstay joiner;

said seat tube joiner being formed of continuous hollow walls having a seat tube width relative to said seat tube axis and longitudinal axis;

said bottom bracket member extending from a drive side edge to a non-drive side edge to define a bottom bracket width;

said bottom bracket width being substantially greater than said seat tube width and said seat tube joiner depending asymmetrically outwardly from said seat tube width to said bottom bracket width;

said chainstay joiner projects rearwardly to join chainstays;

said chainstay joiner is formed to have a drive side wall and a non-drive side, said drive side wall is substantially flat and said non-drive side has a curvature relative to said drive side wall to better resist force transmission by a chain extending between a crank mounted to said bottom bracket and a wheel mounted at the end of the chainstays;

said second integral mating portion extending from said bottom bracket subassembly with a down tube portion to join said third integral mating portion;

said third integral mating portion having a head segment, and top tube portion formed in a single head subassembly and a down tube joiner adapted to receive down tube portion of said second integral mating portion and said top tube portion adapted to join said seat support subassembly, to form the complete diamond frame;

said head segment has an upper edge and a lower edge and is formed and arranged so that said upper bearing seat and lower bearing seat have walls inward from said upper and lower edges and are fully defined for receiving upper and lower bearings directly therein;

said seat mast telescopingly receives an elliptical seat cap formed from a fiber reinforced plastic shell having a cap wall and top, said cap wall defining an interior chamber having a surface which closely corresponds to an exterior surface of said mast, said cap telescoping on said mast for seat height adjustment.

3. The frame of claim 2 and:

a fork is fitted to said head structure for rotation about said head tube axis, said fork having a steer tube with a top end and a lower bearing seat, a fork crown and blade terminating in a tip, and being formed substantially entirely of fiber reinforced plastic made up of a plurality of layers formed in laminations in which at least one layer is formed of unidirectional fibers in which a plurality of said fibers in said layers extends the entire length of said fork from said tip to said top end and passing through said fork crown;

said fork is formed to have additional reinforcements proximate said fork crown in which said reinforcements strengthen said fork crown but also provide evident areas of stress in the event selected loads are exceeded.

4. The frame of claim 2 and:

said seat cap terminates in a top having a transverse aperture, said transverse aperture having transversely opposed beveled walls, said beveled walls receiving a seat clamp mechanism formed to mate with said walls and provide seat angle adjustment by rotation about more than a single axis.

5. The frame of claim 2 and:

the wall of said down tube portion is formed with an elliptical section, the elliptical section having a long axis and a short axis perpendicular to said long axis, said elliptical section being located proximate said bottom bracket subassembly, said down tube portion being formed to have a hollow thin wall, said long axis being aligned transversely for improved power transmission by the rider and said short axis permitting relatively greater absorption of loads imposed by the road surface and formed with a substantially circular section proximate said down tube joiner.

6. The frame of claim 2 and:

the wall of said seat tube portion proximate said cruciform seat support subassembly is formed with an elliptical section, the elliptical section having a long axis and a short axis perpendicular to said long axis, said seat tube portion being formed to have a hollow thin wall, said long axis being aligned transversely for improved power transmission by the rider and said short axis permitting relatively greater absorption of loads imposed by the road surface and formed with a substantially circular section proximate said seat tube joiner.

7. The frame of claim 2 and:
the wall of said top tube portion proximate said cruciform seat support subassembly is formed as a substantially triangular section proximate said head structure.

8. The frame of claim 2 and:
a main joint between said down tube portion and down tube joiner, a top joint between said top tube portion and said top tube joiner, a seat joint between said seat tube portion and said seat tube joiner, a chainstay joint between said chainstay joiner and chainstay assembly and a seatstay joint between said seatstay assembly and said seatstay joiner, said joints being spaced away from said down tube axis, top tube axis, seat tube axis and head tube axis that principal loads are borne by the structure of the joiners and are not substantially placed on said joints.

9. The frame of claim 2 and:
said seat cap is formed as one of:
a cap slotted at the rear and fitted with a compression bolt directly compressing side portions to clamp said mast;
a cap slotted at the rear and fitted with a metallic band and bolt assembly compression of a slotted wall;
a cap defining a cavity and a bolt receiving fastener, said bold compressing a single wedge member against the interior of the cap; or
a cap defining a cavity and a bolt receiving fastener, said bold compressing a plurality of wedge members against the interior of the cap.

10. The frame of claim 2 and:
said seat mast and said cap coacting such that a seat mast of approximately 95 cm length allows about 60 mm to 100 mm of vertical seat adjustment the range varying selectively based on the choice of a particular height of said cap and longitudinal seat position is controlled by varying selectively based on the choice of a particular positive or negative offset of said cap.

11. The frame of claim 2 further comprising:
said bottom bracket assembly having a drive side and a non-drive side and being laterally asymmetric;
a tapered seat tube joiner wall tapers away from said seat axis at a greater angle on the non-drive side than on the drive side.

12. The frame of claim 11 and
said bottom bracket assembly having a crank spindle receiving portion coaxial with the bottom bracket axis and perpendicular to the main axis;
said crank spindle receiving portion having a drive side bearing seat adapted to directly receive a drive side bearing therein and a non-drive side bearing seat adapted to directly receive a non-drive side bearing therein such that said non-drive side bearing seat is spaced farther from said seat tube axis than said drive side bearing seat;
said crank spindle receiving portion having laterally projecting cylindrical walls;
said cylindrical walls being formed of an array of stepped and annular surfaces from a plurality of unidirectional fiber reinforced laminations, said stepped and annular surfaces forming seats adapted for the slip fit of bearings or the direct press fit of bearings, said bearings directly contacting said surface.

13. An improved substantially all composite bicycle frame of a diamond configuration geometrically formed to have a longitudinal axis, a head tube axis, a seat tube axis, a down tube axis and a bottom bracket axis, having a main triangle and rear triangle, said triangles being joined at the seat tube axis, a seat attachment arrangement, a crank attachment arrangement, and a fork attachment arrangement, the improvement comprising:
the main triangle formed of a first integral mating portion, a second integral mating portion and a third integral mating portion;
the rear triangle formed of a seat stay structure and a chainstay structure;
the crank attachment arrangement being an asymmetric bottom bracket aligned with the bottom bracket axis and perpendicular to the seat tube axis;
said crank attachment arrangement having a drive side bearing seat adapted to directly receive a drive side bearing therein and a non-drive side bearing seat adapted to directly receive a non-drive side bearing therein such that said non-drive side bearing seat is spaced farther from said seat tube axis than said drive side bearing seat;
the seat attachment arrangement being an integral seat mast receiving a telescoping seat cap;
the fork attachment arrangement being a head structure aligned with the head tube axis;
said head structure having an upper fork bearing and a lower fork bearing, the head structure directly and coaxially receiving said upper and lower fork bearings therein, said lower fork bearing being of a diameter larger than said upper fork bearing;
said first integral mating portion being a cruciform seat support subassembly including a seat tube portion, an upwardly extending seat mast, a downwardly and rearwardly extending seatstay joiner for receiving the seatstay structure and a top tube joiner so that the functions of a traditional seat lug and seat tube are combined into a single unitary structure;
said seat tube portion of first integral mating portion extends downwardly and is bonded to said second integral mating portion;
said second integral mating portion being a bottom bracket subassembly having an upwardly extending seat tube joiner, a down tube portion, a bottom bracket member and chainstay joiner;
said seat tube joiner being formed of continuous hollow walls having a seat tube width relative to said seat tube axis and longitudinal axis;
said bottom bracket member extending from a drive side edge to a non-drive side edge to define a bottom bracket width;
said bottom bracket width being substantially greater than said seat tube width and said seat tube joiner depending asymmetrically outwardly from said seat tube width to said bottom bracket width;
said chainstay joiner projects rearwardly to join chainstays;
said chainstay joiner is formed to have a drive side wall and a non-drive side, said drive side wall is substantially flat and said non-drive side has a curvature relative to said drive side wall to better resist force transmission by a chain extending between a crank mounted to said bottom bracket and a wheel mounted at the end of the chainstays;
said second integral mating portion extending from said bottom bracket subassembly with a down tube portion to join said third integral mating portion;
said third integral mating portion having a head segment, and top tube portion formed in a single head subassembly and a down tube joiner adapted to receive down tube portion of said second integral mating portion and said top tube portion adapted to join said seat support subassembly, to form the complete diamond frame;

said head segment has an upper edge and a lower edge and is formed and arranged so that said upper bearing seat and lower bearing seat have walls inward from said upper and lower edges and are fully defined for receiving upper and lower bearings directly therein;

said seat mast telescopingly receives an elliptical seat cap formed from a fiber reinforced plastic shell having a cap wall and top, said cap wall defining an interior chamber having a surface which closely corresponds to an exterior surface of said mast, said cap telescoping on said mast for seat height adjustment;

said frame being formed with a layup schedule ranging from 4 ply laminations in low load areas, up to 12 ply laminations in high load areas, with spot reinforcements as needed, said frame being formed of a geometry in one of various selected sizes denoted based on seat tube length such that a 56 cm seat tube length frame has a mass of less than 900 grams.

14. The frame of claim 13 and:

said seat mast and said cap coacting such that a seat mast of approximately 95 cm length allows about 60 mm to 100 mm of vertical seat adjustment the range varying selectively based on the choice of a particular height of said cap and longitudinal seat position is controlled by varying selectively based on the choice of a particular positive or negative offset of said cap.

15. The frame of claim 14 and said bottom bracket assembly having a crank spindle receiving portion coaxial with the bottom bracket axis and perpendicular to the main axis;

said crank spindle receiving portion having a drive side bearing seat adapted to directly receive a drive side bearing therein and a non-drive side bearing seat adapted to directly receive a non-drive side bearing therein such that said non-drive side bearing seat is spaced farther from said seat tube axis than said drive side bearing seat;

said crank spindle receiving portion having laterally projecting cylindrical walls;

said cylindrical walls being formed of an array of stepped and annular surfaces from a plurality of unidirectional fiber reinforced laminations, said stepped and annular surfaces forming seats adapted for the slip fit of bearings or the direct press fit of bearings, said bearings directly contacting said surface.

16. The frame of claim 13 and:

said seat cap is formed as one of:

a cap slotted at the rear and fitted with a compression bolt directly compressing side portions to clamp said mast;

a cap slotted at the rear and fitted with a metallic band and bolt assembly compression of a slotted wall;

a cap defining a cavity and a bolt receiving fastener, said bold compressing a single wedge member against the interior of the cap; or a cap defining a cavity and a bolt receiving fastener, said bold compressing a plurality of wedge members against the interior of the cap.

17. A bottom bracket assembly for a bicycle frame comprising:

the frame having a steering axis, a seat axis, a main axis and a bottom bracket axis;

said steering axis, seat axis and main axis being coplanar in a plane and said bottom bracket axis is oriented perpendicularly to said plane;

said bottom bracket assembly having a drive side and a non-drive side and being laterally asymmetric on opposed sides of said plane;

said bottom bracket assembly being formed of a thin, continuous, wall material defining a tapered seat tube joiner wall that tapers away from said seat axis at a greater angle on the non-drive side than on the drive side.

18. A bottom bracket assembly for a bicycle frame comprising:

the frame having a steering axis, a seat axis, a main axis and a bottom bracket axis;

said bottom bracket assembly having a drive side and a non-drive side and being laterally asymmetric;

said bottom bracket assembly being formed of a thin, continuous, wall material defining a tapered seat tube joiner wall that tapers away from said seat axis at a greater angle on the non-drive side than on the drive side said bottom bracket assembly having a crank spindle receiving portion coaxial with the bottom bracket axis and perpendicular to the main axis;

said crank spindle receiving portion having a drive side bearing seat adapted to directly receive a drive side bearing therein and a non-drive side bearing seat adapted to directly receive a non-drive side bearing therein such that said non-drive side bearing seat is spaced farther from said seat tube axis than said drive side bearing seat;

said crank spindle receiving portion having laterally projecting cylindrical walls ending in drive side and non-drive side edges;

said cylindrical walls being formed of an array of stepped and annular surfaces from a plurality of unidirectional fiber reinforced laminations, said stepped and annular surfaces forming seats adapted for the slip fit of bearings or the direct press fit of bearings, said bearings directly contacting said surface.

19. The bottom bracket assembly of claim 18 and said tapered seat tube joiner wall extending substantially the entire width of the cylindrical walls, from the drive side edge to non-drive side edge, a dimension of substantially 90 mm.

20. The bottom bracket assembly of claim 19 and:

said bottom bracket assembly having a tapered down tube joiner receivable of a down tube, said down tube joiner wall extending substantially the entire width of the cylindrical walls, from the drive side edge to non-drive side edge, a dimension of substantially 75 mm;

said a tapered down tube joiner wall tapers away from said main axis at a greater angle on the non-drive side than on the drive side.

\* \* \* \* \*